(12) United States Patent
Smith

(10) Patent No.: US 10,856,011 B2
(45) Date of Patent: Dec. 1, 2020

(54) METHOD AND APPARATUS FOR COLOR DIFFERENCE TRANSFORM

(71) Applicant: WARNER BROS. ENTERTAINMENT INC., Burbank, CA (US)

(72) Inventor: Michael D. Smith, Santa Monica, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 0 days.

(21) Appl. No.: 16/192,960

(22) Filed: Nov. 16, 2018

(65) Prior Publication Data

US 2019/0208228 A1 Jul. 4, 2019

Related U.S. Application Data

(63) Continuation of application No. 14/485,640, filed on Sep. 12, 2014, now Pat. No. 10,178,413.

(60) Provisional application No. 61/877,172, filed on Sep. 12, 2013.

(51) Int. Cl.
*H04N 19/85* (2014.01)
*H04N 19/186* (2014.01)
*H04N 1/64* (2006.01)

(52) U.S. Cl.
CPC ............ *H04N 19/85* (2014.11); *H04N 1/646* (2013.01); *H04N 19/186* (2014.11)

(58) Field of Classification Search
CPC ....... H04N 19/85; H04N 1/646; H04N 19/186
See application file for complete search history.

(56) References Cited

U.S. PATENT DOCUMENTS

| | | | |
|---|---|---|---|
| 2005/0030305 A1 | 2/2005 | Brown et al. | |
| 2005/0265625 A1 | 12/2005 | Li et al. | |
| 2005/0276486 A1 | 12/2005 | Withers et al. | |
| 2007/0025631 A1 | 2/2007 | Kim et al. | |
| 2009/0285478 A1* | 11/2009 | Thiebaud | H04N 1/60 382/166 |
| 2010/0108989 A1 | 8/2010 | Narroschke et al. | |
| 2010/0208989 A1* | 8/2010 | Narroschke | H04N 1/646 382/166 |
| 2011/0305391 A1 | 12/2011 | Kunkel et al. | |
| 2012/0206476 A1* | 8/2012 | Woolfe | H04N 1/60 345/589 |
| 2012/0307906 A1 | 12/2012 | Kim et al. | |
| 2013/0195183 A1 | 8/2013 | Zhai et al. | |
| 2014/0355689 A1 | 12/2014 | Tourapis | |

* cited by examiner

*Primary Examiner* — Tracy Y. Li
(74) *Attorney, Agent, or Firm* — One LLP; Jonathan Jaech

(57) ABSTRACT

Efficient image compression for video data characterized by a non-neutral dominant white point is achieved by transforming the input video signal into a de-correlated video signal based on a color difference encoding transform, wherein the color difference encoding transform is adapted based on the dominant white point using an algorithm. The adapting algorithm is designed for optimizing low-entropy output when the white point is other than a neutral or equal-energy value. Decompression is handled conversely.

23 Claims, 14 Drawing Sheets

| | | | | DCDM Code-values | | |
|---|---|---|---|---|---|---|
| White Point Name | x | y | Y | X' | Y' | Z' |
| D55 | 0.3323 | 0.3474 | 48 | 3893 | 3960 | 3838 |
| D60 | 0.3217 | 0.3378 | 48 | 3886 | 3960 | 3972 |
| D61 | 0.3198 | 0.336 | 48 | 3885 | 3960 | 3997 |
| D65 | 0.3127 | 0.329 | 48 | 3883 | 3960 | 4092 |
| EE | 0.3333 | 0.3333 | 48 | 3960 | 3960 | 3960 |
| DCI-P3 Calibration White | 0.314 | 0.351 | 48 | 3794 | 3960 | 3890 |

300 ⟶

| White Point Name | x | y | Y | a | b |
|---|---|---|---|---|---|
| D55 | 0.3323 | 0.3474 | 48 | 0.9692 | 0.9831 |
| D60 | 0.3217 | 0.3378 | 48 | 1.0031 | 0.9814 |
| D61 | 0.3198 | 0.336 | 48 | 1.0093 | 0.9812 |
| D65 | 0.3127 | 0.3290 | 48 | 1.0334 | 0.9806 |
| EE | 0.3333 | 0.3333 | 48 | 1 | 1 |
| DCI-P3 Calibration White | 0.3140 | 0.3510 | 48 | 0.9822 | 0.9581 |

| White Point Name | DCDM Code Values | | | Dzw | Dxw | Dz | Dx |
|---|---|---|---|---|---|---|---|
| | X' | Y' | Z' | | | | |
| D55 | 3893 | 3960 | 3838 | 0 | 0 | -61 | -34 |
| D60 | 3886 | 3960 | 3972 | 0 | 0 | 6 | -37 |
| D61 | 3885 | 3960 | 3997 | 0 | 0 | 19 | -38 |
| D65 | 3883 | 3960 | 4092 | 0 | 0 | 66 | -39 |
| EE | 3960 | 3960 | 3960 | 0 | 0 | 0 | 0 |
| DCI-P3 Calibration White | 3794 | 3960 | 3890 | 0 | 0 | -35 | -83 |

| WHITE POINT NAME | % OF PEAK LUMINANCE (GRAY LEVEL) | DCDM CODE VALUES | | | Dzw | Dxw | Dz | Dx |
|---|---|---|---|---|---|---|---|---|
| | | X' | Y' | Z' | | | | |
| D55 | 100 | 3893 | 3960 | 3838 | 0 | 0 | -61 | -34 |
| D55 | 90 | 3738 | 3803 | 3686 | 0 | 0 | -59 | -33 |
| D55 | 80 | 3573 | 3634 | 3523 | 0 | 0 | -56 | -31 |
| D55 | 75 | 3485 | 3545 | 3436 | 0 | 0 | -55 | -30 |
| D55 | 70 | 3394 | 3452 | 3346 | 0 | 0 | -53 | -29 |
| D55 | 60 | 3199 | 3254 | 3154 | 0 | 0 | -50 | -28 |
| D55 | 50 | 2982 | 3033 | 2940 | 0 | 0 | -47 | -26 |
| D55 | 40 | 2737 | 2784 | 2698 | 0 | 0 | -43 | -24 |
| D55 | 30 | 2450 | 2492 | 2416 | 0 | 0 | -38 | -21 |
| D55 | 25 | 2284 | 2323 | 2252 | 0 | 0 | -36 | -20 |
| D55 | 20 | 2096 | 2132 | 2067 | 0 | 0 | -33 | -18 |
| D55 | 18 | 2013 | 2048 | 1985 | 0 | 0 | -32 | -18 |
| D55 | 15 | 1877 | 1909 | 1850 | 0 | 0 | -30 | -16 |
| D55 | 10 | 1606 | 1633 | 1583 | 0 | 0 | -25 | -14 |
| D55 | 5 | 1230 | 1251 | 1213 | 0 | 0 | -19 | -11 |
| D55 | 4 | 1129 | 1148 | 1113 | 0 | 0 | -18 | -10 |
| D55 | 3 | 1011 | 1028 | 996 | 0 | 0 | -16 | -9 |
| D55 | 2 | 865 | 880 | 852 | 0 | 0 | -14 | -8 |
| D55 | 1 | 662 | 674 | 653 | 0 | 0 | -11 | -6 |
| D55 | 0.5 | 507 | 516 | 500 | 0 | 0 | -8 | -5 |
| D55 | 0.25 | 389 | 395 | 383 | 0 | 0 | -6 | -3 |
| D55 | 0.1 | 273 | 278 | 269 | 0 | 0 | -5 | -3 |
| D55 | 0.05 | 209 | 213 | 206 | 0 | 0 | -4 | -2 |
| D55 | 0.01 | 113 | 115 | 111 | 0 | 0 | -2 | -1 |
| D55 | 0.005 | 86 | 88 | 85 | 0 | 0 | -2 | -1 |

| WHITE POINT NAME | % OF PEAK LUMINANCE (GRAY LEVEL) | DCDM CODE VALUES | | | | | | |
|---|---|---|---|---|---|---|---|---|
| | | X' | Y' | Z' | Dzw | Dxw | Dz | Dx |
| D60 | 100 | 3886 | 3960 | 3972 | 0 | 0 | 6 | -37 |
| D60 | 90 | 3732 | 3803 | 3814 | 0 | 0 | 6 | -36 |
| D60 | 80 | 3567 | 3634 | 3645 | 0 | 0 | 6 | -34 |
| D60 | 75 | 3479 | 3545 | 3556 | 0 | 0 | 6 | -33 |
| D60 | 70 | 3388 | 3452 | 3463 | 0 | 0 | 6 | -32 |
| D60 | 60 | 3193 | 3254 | 3264 | 0 | 0 | 5 | -31 |
| D60 | 50 | 2977 | 3033 | 3043 | 0 | 0 | 5 | -28 |
| D60 | 40 | 2732 | 2784 | 2792 | 0 | 0 | 4 | -26 |
| D60 | 30 | 2446 | 2492 | 2500 | 0 | 0 | 4 | -23 |
| D60 | 25 | 2280 | 2323 | 2331 | 0 | 0 | 4 | -22 |
| D60 | 20 | 2093 | 2132 | 2139 | 0 | 0 | 4 | -20 |
| D60 | 18 | 2010 | 2048 | 2054 | 0 | 0 | 3 | -19 |
| D60 | 15 | 1874 | 1909 | 1915 | 0 | 0 | 3 | -18 |
| D60 | 10 | 1603 | 1633 | 1638 | 0 | 0 | 3 | -15 |
| D60 | 5 | 1228 | 1251 | 1255 | 0 | 0 | 2 | -12 |
| D60 | 4 | 1127 | 1148 | 1152 | 0 | 0 | 2 | -11 |
| D60 | 3 | 1009 | 1028 | 1031 | 0 | 0 | 2 | -10 |
| D60 | 2 | 863 | 880 | 882 | 0 | 0 | 1 | -9 |
| D60 | 1 | 661 | 674 | 676 | 0 | 0 | 1 | -7 |
| D60 | 0.5 | 506 | 516 | 518 | 0 | 0 | 1 | -5 |
| D60 | 0.25 | 388 | 395 | 396 | 0 | 0 | 1 | -4 |
| D60 | 0.1 | 273 | 278 | 279 | 0 | 0 | 1 | -3 |
| D60 | 0.05 | 209 | 213 | 214 | 0 | 0 | 1 | -2 |
| D60 | 0.01 | 112 | 115 | 115 | 0 | 0 | 0 | -2 |

| WHITE POINT NAME | % OF PEAK LUMINANCE (GRAY LEVEL) | DCDM CODE VALUES | | | | | | |
|---|---|---|---|---|---|---|---|---|
| | | X' | Y' | Z' | Dzw | Dxw | Dz | Dx |
| D61 | 100 | 3885 | 3960 | 3997 | 0 | 0 | 19 | -38 |
| D61 | 90 | 3731 | 3803 | 3838 | 0 | 0 | 18 | -36 |
| D61 | 80 | 3566 | 3634 | 3668 | 0 | 0 | 17 | -34 |
| D61 | 75 | 3479 | 3545 | 3578 | 0 | 0 | 17 | -33 |
| D61 | 70 | 3387 | 3452 | 3485 | 0 | 0 | 17 | -33 |
| D61 | 60 | 3192 | 3254 | 3284 | 0 | 0 | 15 | -31 |
| D61 | 50 | 2976 | 3033 | 3062 | 0 | 0 | 15 | -29 |
| D61 | 40 | 2731 | 2784 | 2810 | 0 | 0 | 13 | -27 |
| D61 | 30 | 2445 | 2492 | 2515 | 0 | 0 | 12 | -24 |
| D61 | 25 | 2280 | 2323 | 2345 | 0 | 0 | 11 | -22 |
| D61 | 20 | 2092 | 2132 | 2152 | 0 | 0 | 10 | -20 |
| D61 | 18 | 2009 | 2048 | 2067 | 0 | 0 | 10 | -20 |
| D61 | 15 | 1873 | 1909 | 1927 | 0 | 0 | 9 | -18 |
| D61 | 10 | 1603 | 1633 | 1649 | 0 | 0 | 8 | -15 |
| D61 | 5 | 1228 | 1251 | 1263 | 0 | 0 | 6 | -12 |
| D61 | 4 | 1127 | 1148 | 1159 | 0 | 0 | 6 | -11 |
| D61 | 3 | 1009 | 1028 | 1038 | 0 | 0 | 5 | -10 |
| D61 | 2 | 863 | 880 | 888 | 0 | 0 | 4 | -9 |
| D61 | 1 | 661 | 674 | 680 | 0 | 0 | 3 | -7 |
| D61 | 0.5 | 506 | 516 | 521 | 0 | 0 | 3 | -5 |
| D61 | 0.25 | 388 | 395 | 399 | 0 | 0 | 2 | -4 |
| D61 | 0.1 | 273 | 278 | 280 | 0 | 0 | 1 | -3 |
| D61 | 0.05 | 209 | 213 | 215 | 0 | 0 | 1 | -2 |
| D61 | 0.01 | 112 | 115 | 116 | 0 | 0 | 1 | -2 |
| D61 | 0.005 | 86 | 88 | 89 | 0 | 0 | 1 | -1 |

| WHITE POINT NAME | % OF PEAK LUMINANCE (GRAY LEVEL) | DCDM CODE VALUES | | | | | | |
|---|---|---|---|---|---|---|---|---|
| | | X' | Y' | Z' | Dzw | Dxw | Dz | Dx |
| D65 | 100 | 3883 | 3960 | 4092 | 0 | 0 | 66 | -39 |
| D65 | 90 | 3729 | 3803 | 3930 | 0 | 0 | 64 | -37 |
| D65 | 80 | 3564 | 3634 | 3756 | 0 | 0 | 61 | -35 |
| D65 | 75 | 3477 | 3545 | 3664 | 0 | 0 | 60 | -34 |
| D65 | 70 | 3386 | 3452 | 3568 | 0 | 0 | 58 | -33 |
| D65 | 60 | 3191 | 3254 | 3362 | 0 | 0 | 54 | -32 |
| D65 | 50 | 2975 | 3033 | 3135 | 0 | 0 | 51 | -29 |
| D65 | 40 | 2730 | 2784 | 2877 | 0 | 0 | 47 | -27 |
| D65 | 30 | 2444 | 2492 | 2575 | 0 | 0 | 42 | -24 |
| D65 | 25 | 2279 | 2323 | 2401 | 0 | 0 | 39 | -22 |
| D65 | 20 | 2091 | 2132 | 2204 | 0 | 0 | 36 | -21 |
| D65 | 18 | 2008 | 2048 | 2116 | 0 | 0 | 34 | -20 |
| D65 | 15 | 1872 | 1909 | 1973 | 0 | 0 | 32 | -19 |
| D65 | 10 | 1602 | 1633 | 1688 | 0 | 0 | 28 | -16 |
| D65 | 5 | 1227 | 1251 | 1293 | 0 | 0 | 21 | -12 |
| D65 | 4 | 1126 | 1148 | 1187 | 0 | 0 | 20 | -11 |
| D65 | 3 | 1008 | 1028 | 1062 | 0 | 0 | 17 | -10 |
| D65 | 2 | 863 | 880 | 909 | 0 | 0 | 15 | -9 |
| D65 | 1 | 661 | 674 | 696 | 0 | 0 | 11 | -7 |
| D65 | 0.5 | 506 | 516 | 533 | 0 | 0 | 9 | -5 |
| D65 | 0.25 | 388 | 395 | 408 | 0 | 0 | 7 | -4 |
| D65 | 0.1 | 272 | 278 | 287 | 0 | 0 | 5 | -3 |
| D65 | 0.05 | 209 | 213 | 220 | 0 | 0 | 4 | -2 |
| D65 | 0.01 | 112 | 115 | 118 | 0 | 0 | 2 | -2 |
| D65 | 0.005 | 86 | 88 | 91 | 0 | 0 | 2 | -1 |

| WHITE POINT NAME | % OF PEAK LUMINANCE (GRAY LEVEL) | DCDM CODE VALUES | | | Dzw | Dxw | Dz | Dx |
|---|---|---|---|---|---|---|---|---|
| | | X' | Y' | Z' | | | | |
| EE | 100 | 3960 | 3960 | 3960 | 0 | 0 | 0 | 0 |
| EE | 90 | 3803 | 3803 | 3803 | 0 | 0 | 0 | 0 |
| EE | 80 | 3634 | 3634 | 3634 | 0 | 0 | 0 | 0 |
| EE | 75 | 3545 | 3545 | 3545 | 0 | 0 | 0 | 0 |
| EE | 70 | 3452 | 3452 | 3452 | 0 | 0 | 0 | 0 |
| EE | 60 | 3254 | 3254 | 3254 | 0 | 0 | 0 | 0 |
| EE | 50 | 3033 | 3033 | 3033 | 0 | 0 | 0 | 0 |
| EE | 40 | 2784 | 2784 | 2784 | 0 | 0 | 0 | 0 |
| EE | 30 | 2492 | 2492 | 2492 | 0 | 0 | 0 | 0 |
| EE | 25 | 2323 | 2323 | 2323 | 0 | 0 | 0 | 0 |
| EE | 20 | 2132 | 2132 | 2132 | 0 | 0 | 0 | 0 |
| EE | 18 | 2048 | 2048 | 2048 | 0 | 0 | 0 | 0 |
| EE | 15 | 1909 | 1909 | 1909 | 0 | 0 | 0 | 0 |
| EE | 10 | 1633 | 1633 | 1633 | 0 | 0 | 0 | 0 |
| EE | 5 | 1251 | 1251 | 1251 | 0 | 0 | 0 | 0 |
| EE | 4 | 1148 | 1148 | 1148 | 0 | 0 | 0 | 0 |
| EE | 3 | 1028 | 1028 | 1028 | 0 | 0 | 0 | 0 |
| EE | 2 | 880 | 880 | 880 | 0 | 0 | 0 | 0 |
| EE | 1 | 674 | 674 | 674 | 0 | 0 | 0 | 0 |
| EE | 0.5 | 516 | 516 | 516 | 0 | 0 | 0 | 0 |
| EE | 0.25 | 395 | 395 | 395 | 0 | 0 | 0 | 0 |
| EE | 0.1 | 278 | 278 | 278 | 0 | 0 | 0 | 0 |
| EE | 0.05 | 213 | 213 | 213 | 0 | 0 | 0 | 0 |
| EE | 0.01 | 115 | 115 | 115 | 0 | 0 | 0 | 0 |
| EE | 0.005 | 88 | 88 | 88 | 0 | 0 | 0 | 0 |

DCI-P3 CALIBRATION WHITE - a=0.9822, b=0.9581

| WHITE POINT NAME | % OF PEAK LUMINANCE (GRAY LEVEL) | DCDM CODE VALUES | | | | | | |
|---|---|---|---|---|---|---|---|---|
| | | X' | Y' | Z' | Dzw | Dxw | Dz | Dx |
| DCI-P3 CALIBRATION WHITE | 100 | 3794 | 3960 | 3890 | 0 | 0 | -35 | -83 |
| DCI-P3 CALIBRATION WHITE | 90 | 3643 | 3803 | 3735 | 0 | 0 | -34 | -80 |
| DCI-P3 CALIBRATION WHITE | 80 | 3482 | 3634 | 3570 | 0 | 0 | -32 | -76 |
| DCI-P3 CALIBRATION WHITE | 75 | 3397 | 3545 | 3482 | 0 | 0 | -32 | -74 |
| DCI-P3 CALIBRATION WHITE | 70 | 3308 | 3452 | 3391 | 0 | 0 | -31 | -72 |
| DCI-P3 CALIBRATION WHITE | 60 | 3117 | 3254 | 3196 | 0 | 0 | -29 | -69 |
| DCI-P3 CALIBRATION WHITE | 50 | 2906 | 3033 | 2979 | 0 | 0 | -27 | -64 |
| DCI-P3 CALIBRATION WHITE | 40 | 2667 | 2784 | 2734 | 0 | 0 | -25 | -59 |
| DCI-P3 CALIBRATION WHITE | 30 | 2388 | 2492 | 2448 | 0 | 0 | -22 | -52 |
| DCI-P3 CALIBRATION WHITE | 25 | 2226 | 2323 | 2282 | 0 | 0 | -21 | -49 |
| DCI-P3 CALIBRATION WHITE | 20 | 2043 | 2132 | 2094 | 0 | 0 | -19 | -45 |
| DCI-P3 CALIBRATION WHITE | 18 | 1962 | 2048 | 2011 | 0 | 0 | -19 | -43 |
| DCI-P3 CALIBRATION WHITE | 15 | 1829 | 1909 | 1875 | 0 | 0 | -17 | -40 |
| DCI-P3 CALIBRATION WHITE | 10 | 1565 | 1633 | 1604 | 0 | 0 | -15 | -34 |
| DCI-P3 CALIBRATION WHITE | 5 | 1199 | 1251 | 1229 | 0 | 0 | -11 | -26 |
| DCI-P3 CALIBRATION WHITE | 4 | 1100 | 1148 | 1128 | 0 | 0 | -10 | -24 |
| DCI-P3 CALIBRATION WHITE | 3 | 985 | 1028 | 1010 | 0 | 0 | -9 | -22 |
| DCI-P3 CALIBRATION WHITE | 2 | 843 | 880 | 864 | 0 | 0 | -8 | -19 |
| DCI-P3 CALIBRATION WHITE | 1 | 645 | 674 | 662 | 0 | 0 | -6 | -15 |
| DCI-P3 CALIBRATION WHITE | 0.5 | 494 | 516 | 507 | 0 | 0 | -5 | -11 |
| DCI-P3 CALIBRATION WHITE | 0.25 | 379 | 395 | 388 | 0 | 0 | -4 | -8 |
| DCI-P3 CALIBRATION WHITE | 0.1 | 266 | 278 | 273 | 0 | 0 | -3 | -6 |
| DCI-P3 CALIBRATION WHITE | 0.05 | 204 | 213 | 209 | 0 | 0 | -2 | -5 |
| DCI-P3 CALIBRATION WHITE | 0.01 | 110 | 115 | 113 | 0 | 0 | -1 | -3 |
| DCI-P3 CALIBRATION WHITE | 0.005 | 84 | 88 | 86 | 0 | 0 | -1 | -2 |

| White Point Name | x | y | a | b | c | d |
|---|---|---|---|---|---|---|
| D55 | 0.3323 | 0.3474 | 0.9692 | 0.9831 | 1 | 1 |
| D60 | 0.3217 | 0.3378 | 1.0031 | 0.9814 | 0.99694 | 1 |
| D61 | 0.3198 | 0.336 | 1.0093 | 0.9812 | 0.99077 | 1 |
| D65 | 0.3127 | 0.3290 | 1.0334 | 0.9806 | 0.96772 | 1 |
| EE | 0.3333 | 0.3333 | 1 | 1 | 1 | 1 |
| DCI-P3 Calibration White | 0.3140 | 0.3510 | 0.9822 | 0.9581 | 1 | 1 |

| | DCDM CODE VALUES | | | WITH c AND d SCALING | | WITHOUT c AND d SCALING | | | |
|---|---|---|---|---|---|---|---|---|---|
| COLOR NAME | X' | Y' | Z' | Dzw | Dxw | Dzw | Dxw | Dz | Dx |
| D60 - 100% WHITE | 3886 | 3960 | 3972 | 0 | 0 | 0 | 0 | 6 | -37 |
| D60 - 18% GREY | 2010 | 2048 | 2054 | 0 | 0 | 0 | 0 | 3 | -19 |
| D60 - 1% BLACK | 661 | 674 | 676 | 0 | 0 | 0 | 0 | 1 | -7 |
| INVISIBLE COLOR FOR DYNAMIC RANGE TEST | 0 | 4095 | 0 | -2048 | -2009 | -2054 | -2009 | -2048 | -2048 |

| | DCDM CODE VALUES | | | WITH c AND d SCALING | | WITHOUT c AND d SCALING | | | |
|---|---|---|---|---|---|---|---|---|---|
| COLOR NAME | X' | Y' | Z' | Dzw | Dxw | Dzw | Dxw | Dz | Dx |
| D61 - 100% WHITE | 3885 | 3960 | 3997 | 0 | 0 | 0 | 0 | 19 | -38 |
| D61 - 18% GREY | 2009 | 2048 | 2067 | 0 | 0 | 0 | 0 | 10 | -20 |
| D61 - 1% BLACK | 661 | 674 | 680 | 0 | 0 | 0 | 0 | 3 | -7 |
| INVISIBLE COLOR FOR DYNAMIC RANGE TEST | 0 | 4095 | 0 | -2048 | -2009 | -2067 | -2009 | -2048 | -2048 |

| COLOR NAME | DCDM CODE VALUES | | | WITH c AND d SCALING | | WITHOUT c AND d SCALING | | | |
|---|---|---|---|---|---|---|---|---|---|
| | X' | Y' | Z' | Dzw | Dxw | Dzw | Dxw | Dz | Dx |
| D65 - 100% WHITE | 3883 | 3960 | 4092 | 0 | 0 | 0 | 0 | 66 | -39 |
| D65 - 18% GREY | 2008 | 2048 | 2116 | 0 | 0 | 0 | 0 | 34 | -20 |
| D65 - 1% BLACK | 661 | 674 | 696 | 0 | 0 | 0 | 0 | 11 | -7 |
| INVISIBLE COLOR FOR DYNAMIC RANGE TEST | 0 | 4095 | 0 | -2048 | -2008 | -2116 | -2008 | -2048 | -2048 |

| NAME | x | y | Y | Xcw | Ycw | Zcw | a | b | c | d |
|---|---|---|---|---|---|---|---|---|---|---|
| D55 - 50% | 0.3323 | 0.3474 | 0.5 | 0.47827 | 0.5 | 0.46100 | 0.99060 | 0.99486 | 1 | 1 |
| D55 - 10% | 0.3323 | 0.3474 | 0.1 | 0.09565 | 0.1 | 0.09220 | 0.98822 | 0.99356 | 1 | 1 |
| D55 - 5% | 0.3323 | 0.3474 | 0.05 | 0.04783 | 0.05 | 0.04610 | 0.98706 | 0.99292 | 1 | 1 |
| D55 - 1% | 0.3323 | 0.3474 | 0.01 | 0.00957 | 0.01 | 0.00922 | 0.98400 | 0.99123 | 1 | 1 |
| D55 - 0.5% | 0.3323 | 0.3474 | 0.005 | 0.00478 | 0.005 | 0.00461 | 0.98252 | 0.99042 | 1 | 1 |
| D60 - 50% | 0.3217 | 0.3378 | 0.5 | 0.47617 | 0.5 | 0.50400 | 1.00092 | 0.99435 | 0.99908 | 1 |
| D60 - 10% | 0.3217 | 0.3378 | 0.1 | 0.09523 | 0.1 | 0.10080 | 1.00115 | 0.99292 | 0.99885 | 1 |
| D60 - 5% | 0.3217 | 0.3378 | 0.05 | 0.04762 | 0.05 | 0.05040 | 1.00127 | 0.99222 | 0.99873 | 1 |
| D60 - 1% | 0.3217 | 0.3378 | 0.01 | 0.00952 | 0.01 | 0.01008 | 1.00157 | 0.99037 | 0.99843 | 1 |
| D60 - 0.5% | 0.3217 | 0.3378 | 0.005 | 0.00476 | 0.005 | 0.00504 | 1.00172 | 0.98948 | 0.99828 | 1 |
| D61 - 50% | 0.3198 | 0.3360 | 0.5 | 0.47589 | 0.5 | 0.51220 | 1.00279 | 0.99428 | 0.99722 | 1 |
| D61 - 10% | 0.3198 | 0.3360 | 0.1 | 0.09518 | 0.1 | 0.10244 | 1.00350 | 0.99283 | 0.99652 | 1 |
| D61 - 5% | 0.3198 | 0.3360 | 0.05 | 0.04759 | 0.05 | 0.05122 | 1.00385 | 0.99212 | 0.99617 | 1 |
| D61 - 1% | 0.3198 | 0.3360 | 0.01 | 0.00952 | 0.01 | 0.01024 | 1.00477 | 0.99025 | 0.99525 | 1 |
| D61 - 0.5% | 0.3198 | 0.3360 | 0.005 | 0.00476 | 0.005 | 0.00512 | 1.00521 | 0.98935 | 0.99481 | 1 |
| D65 - 50% | 0.3127 | 0.3290 | 0.5 | 0.47523 | 0.5 | 0.54453 | 1.00985 | 0.99412 | 0.99024 | 1 |
| D65 - 10% | 0.3127 | 0.3290 | 0.1 | 0.09505 | 0.1 | 0.10891 | 1.01238 | 0.99263 | 0.98778 | 1 |
| D65 - 5% | 0.3127 | 0.3290 | 0.05 | 0.04752 | 0.05 | 0.05445 | 1.01362 | 0.99190 | 0.98656 | 1 |
| D65 - 1% | 0.3127 | 0.3290 | 0.01 | 0.00950 | 0.01 | 0.01089 | 1.01690 | 0.98998 | 0.98338 | 1 |
| D65 - 0.5% | 0.3127 | 0.3290 | 0.005 | 0.00475 | 0.005 | 0.00545 | 1.01849 | 0.98905 | 0.98184 | 1 |
| EE - 50% | 0.3333 | 0.3333 | 0.5 | 0.5 | 0.5 | 0.5 | 1 | 1 | 1 | 1 |
| EE - 10% | 0.3333 | 0.3333 | 0.1 | 0.1 | 0.1 | 0.1 | 1 | 1 | 1 | 1 |
| EE - 5% | 0.3333 | 0.3333 | 0.05 | 0.05 | 0.05 | 0.05 | 1 | 1 | 1 | 1 |
| EE - 1% | 0.3333 | 0.3333 | 0.01 | 0.01 | 0.01 | 0.01 | 1 | 1 | 1 | 1 |
| EE - 0.5% | 0.3333 | 0.3333 | 0.005 | 0.005 | 0.005 | 0.005 | 1 | 1 | 1 | 1 |

FIG. 15

METHOD AND APPARATUS FOR COLOR DIFFERENCE TRANSFORM

PRIORITY CLAIM

The present application is a continuation of application Ser. No. 14/485,640, now U.S. Pat. No. 10,178,413issued Jan. 8, 2019, which claims priority under 35 U.S.C. § 119(e) to U.S. provisional application Ser. No. 61/877,172 filed Sep. 12, 2013, which applications are incorporated herein by reference, in their entireties.

FIELD

This application relates to methods and apparatus for X'Y'Z color difference transform as used for digital image (e.g., digital video) processing.

BACKGROUND

Traditional video imaging applications, including digital video, use colors that are defined using an additive display model that utilizes different relationships of red, green and blue lights for each pixel of a display, to represent different colors on the screen for each pixel. These red, green and blue lights may also be called "sub-pixels". Typically, the lights can range from a level of 0% (with no light emitted) to 100% (where the light is outputting as much light as possible). If all the red, green and blue lights are emitting 100% of their peak output for a particular pixel, then the pixel will appear to be "white". If the red, green and blue lights for a particular pixel all emit 50% of their peak output, then the pixel will appear to be "gray". If the red, green and blue lights for a particular pixel all emit 0% of their peak output, then the pixel will appear to be "black". The range from "white" to "gray" to "black" is typically called the neutral or achromatic axis, since it is a range of lights that appear to lack any particular color and hue.

When the red, green and blue lights are all outputting 100% of their possible light output, the display will appear to be "white" at its maximum brightness. This "white" color is often called "display white", and is the color of the "white" at maximum brightness. The color of the "display white" depends on the relationship between the efficiencies between the red, green and blue lights. For example, if the blue light is more efficient and can output more light than the red and green lights, then the "display white" at maximum brightness will look "bluish" and may often be described as "cool" white.

In reality, even neutral achromatic "white" has a small amount of color that may often be described as ranging from "warm" to "cool". "Warm" neutrals are common when a scene is lit with tungsten-based lighting or candlelight, and have a slight yellow-orange color hue. "Cool" neutrals are common when a scene is lit with fluorescent lighting and have a slight bluish hue. The particular color cast or hue of the white in the scene is commonly referred to as the "creative white point". It is common for most features and television to use a particular creative white point for the entirety of the work. Creative white points can often vary from title to title, but are usually in a range of whites defined by the names "D55" which is a warm white and "D65" which is a cool white. Creative white points typically are defined by the creative image content, and not the display or delivery system.

Home video distribution systems commonly use the Rec. 709 video format. Video image data formatted for Rec. 709 color space uses an "encoding white point" of D65, which means that when the encoded Rec. 709 video signal contains equal amounts of red, green and blue video signal, a "D65" neutral color will be displayed to the viewer if the display system is functioning properly. If the video signal is at a 100% level in all red, green and blue channels, the color shown to the viewer will be D65 white. If the video signal is at 20% level in all red, green and blue channels, then the D65 gray color will be shown to the viewer. If other creative white points are used when the video content was mastered, then they can also be represented by the Rec. 709 encoding, but the video signal values representing the red, green and blue channels will not have equal energy when non-D65 creative white points are used.

Color-difference transforms may be useful in imaging applications that support 4:2:2 or 4:2:0 subsampled image formats. Such transforms may allow images to be represented with lower uncompressed data bandwidths and also reduced compressed data rates. A color-difference transform is also useful in imaging applications as it acts as a de-correlation transform that removes redundancy that typically exists among the color components, thereby lowering the entropy of the transformed image data which can improve compression performance. Various color difference transforms are known in the art, but prior transforms may not provide optimal low-entropy output when the white point is other than a neutral or equal-energy value. More robust color transform techniques are therefore desirable.

SUMMARY

Methods, apparatus and systems for digital image (e.g., digital video) processing including robust color difference transform techniques are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for encoding a video signal may be performed by a processor, for example a digital signal processor, in a computing device. The computing device may include an input port for receiving a video signal, for example, from a video camera, video archive stored in a computer readable medium, or transmitted from a remote source. The method may include receiving, by the processor, an input video signal, wherein frames of the input video signal are characterized by a dominant white point. The processor may determine the dominant white point by operating an image analysis algorithm as known in the art for measuring a dominant white point, on the frames. In an alternative, or in addition, the processor may receive an indication of a dominant white point for each of the frames, determined in an independent process, in associated metadata. The method may include transforming the input video signal into a de-correlated video signal based on a color difference encoding transform, using the processor. The method may include adapting the color difference encoding transform based on the dominant white point. For example, the processor may perform the adapting operation using any of the more detailed algorithms described in the detailed disclosure for optimizing low-entropy output when the white point is other than a neutral or equal-energy value. The de-correlated output signal may be compressed for storage in a non-transitory computer-readable medium or for transmission over a communications medium or network. Advantageously, the adaptation of the color difference transform results in more efficient compression for images or video content characterized by a non-neutral white point. Consequently, the storage medium or transmission medium can be used more economically and efficiently for storing or transmitting such images or video content.

In another aspect, a method for decoding a video signal may be performed by a processor, for example a digital signal processor, in a computing device. The decoding method may include receiving an encoded input video signal by a processor, wherein frames of the input video signal are characterized by a dominant white point. The method may include de-compressing the video signal from storage in a non-transitory computer-readable medium or after receiving a compressed signal in a transmission over a communications medium or network. The method may include receiving, by the processor, an indication of a dominant white point that has been independently determined for each of the frames, in associated metadata. The method may further include transforming the input video signal into a correlated video signal based on a color difference decoding transform, using the processor. The method may include adapting the color difference decoding transform based on the dominant white point. For example, the processor may perform the adapting operation as a converse of more detailed encoding algorithms described in the detailed disclosure for optimizing low-entropy output when the white point is other than a neutral or equal-energy value. Advantageously, the adaptation of the color difference transforms results in recovery of the video content having its artistically-intended dominant white point, starting from efficiently compressed data. Consequently, the storage medium or transmission medium can be used more economically and efficiently for storing or transmitting video content that is characterized by a non-neutral white point, without distortion or loss of an intended dominant white point in the end product. The method may include providing the transformed video signal to a display device, causing a video display.

In related aspects, a video signal processing encoding or decoding apparatus may be provided for performing any of the methods and aspects of the methods summarized above. An encoding apparatus may include, for example, a processor coupled to a memory, wherein the memory holds instructions for execution by the processor to cause the apparatus to perform encoding and de-correlation operations as described above, while a decoding apparatus may be similar but hold instructions for correlation and decoding. Either or both apparatus may comprise special-purpose computing devices optimized at least to some degree for video signal processing. Certain aspects of such apparatus (e.g., hardware aspects) may be exemplified by equipment such as a computer server or digital signal processor in a video camera or video processing system, which may be coupled to a video input source and a video output sink and may make use of a multi-core computer graphics (CG) processing subsystem. The CG subsystem may comprise, for example, a high-end video card coupled to a central processing unit (CPU) via a bus, or an integrated graphics processing component built on the same chip as the CPU. Similarly, an article of manufacture may be provided, including a computer-readable storage medium holding encoded instructions, which when executed by a processor, causes a computer to perform the methods and aspects of the methods as summarized above. A system may comprise an encoding apparatus coupled to a decoding apparatus via a communication medium or network.

BRIEF DESCRIPTION OF THE DRAWINGS

The present invention, in accordance with one or more various embodiments, is described in detail with reference to the following figures.

FIG. 3 is a table showing an example of results from calculations using a DCDM encoding function and corresponding white points shown in FIGS. 1 and 2.

FIG. 4 is a table showing an example of $D_z$ and $D_x$ values computed using a simple X'Y'Z'→Y'$D_z D_x$ matrix, compared to values computed using a more advanced matrix X'Y'Z'→Y'$D_{zw} D_{xw}$ specifically for a particular creative white point.

FIGS. 5-10 show tables enumerating DCDM code values through various levels of gray for different creative white points.

FIG. 11 shows a table with examples of 'a,' 'b,' 'c' and 'd' values calculated using the DCDM encoding function and corresponding white points.

FIG. 12 shows a table with values of $D_{zw}$ and $D_{xw}$ with and without scaling, when the Y'$D_{zw} D_{xw}$ transform is computed for D60 creative white point and DCDM encoding.

FIG. 13 shows a table with values of $D_{zw}$ and $D_{xw}$ with and without scaling, when the Y'$D_{zw} D_{xw}$ transform is computed for D61 creative white point and DCDM encoding.

FIG. 14 shows a table with values of $D_{zw}$ and $D_{xw}$ with and without scaling, when the Y'$D_{zw} D_{xw}$ transform is computed for D65 creative white point and DCDM encoding.

FIG. 15 shows a table with different 'a,' 'b,' 'c' and 'd' coefficients that result from using a Dolby PQ encoding function and different creative white points with different luminance levels.

DETAILED DESCRIPTION

Figures 1, 2:
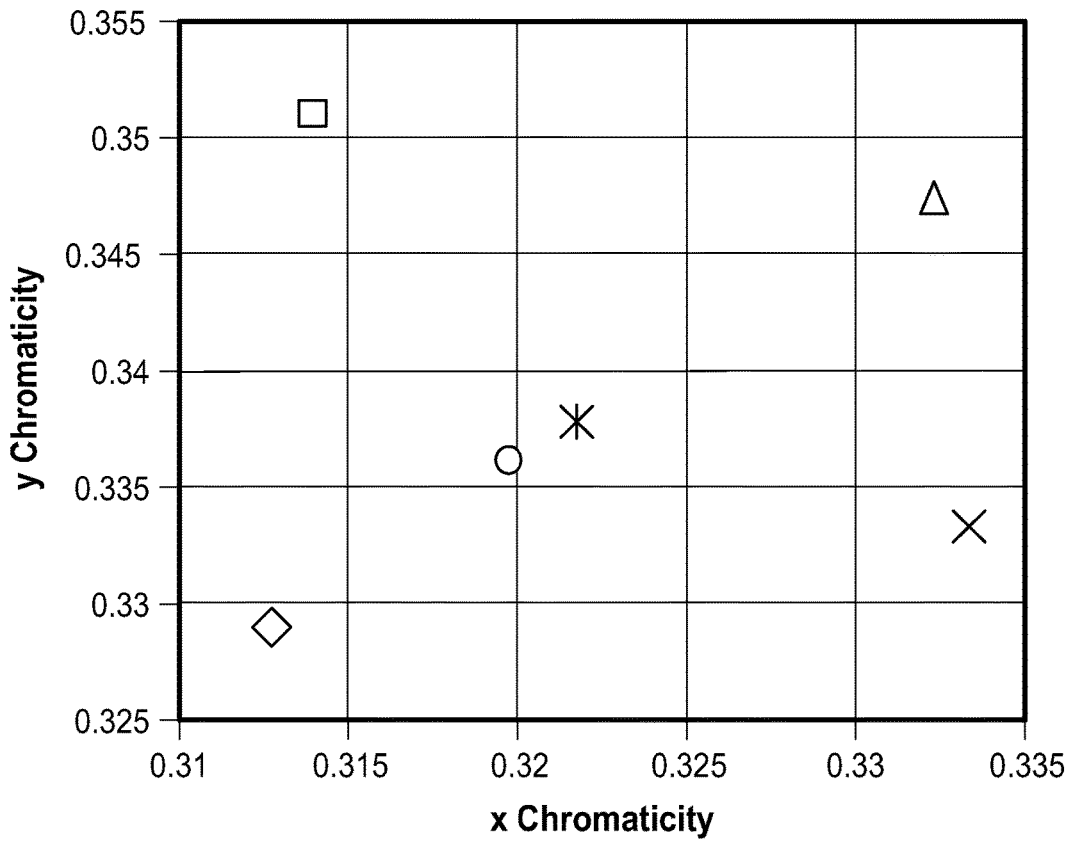
FIG. 1 is a table showing Digital Cinema Distribution Master (DCDM) code-values for particular white points.
FIG. 2 is a line diagram showing an (x,y) chromaticity plot based on the example white points from the table of FIG. 1. The 'a' and 'b' coefficients used by the new color-difference transform matrix may be computed for a particular creative white point, luminance and a particular encoding function.

The present disclosure describes a technology for digital image (e.g., digital video) processing including receiving an encoded input video signal by a processor, wherein one or more frames of the input video signal are characterized by a dominant white point. The input video signal may include, for example, a digital video signal from a digital video camera, or digital video data scanned from an analog format (e.g., film) and converted to a digital format. The technology may include transforming the input video signal into a correlated video signal based on a color difference decoding transform, using the processor. Using one or more algorithms are more particularly described herein, the technology may include adapting the color difference decoding transform based on the dominant white point, using the processor. Subsequently, the correlated video signal may be compressed and stored in a computer-readable memory using any suitable method, or transmitted to a second device for de-correlation and display.

Conversely, on the decoding end, a processor may receive and decompress a video signal using any suitable method, wherein one or more frames of the input video signal are characterized by a dominant white point, and transform the input video signal into a de-correlated video signal based on a color difference encoding transform, using the processor. Likewise, the processor may adapt the color difference encoding transform based on the dominant white point using one or more algorithms as described herein.

As used herein, a dominant white point may include, for example, a quantifiable creative white point defined by an image producer (e.g., in image metadata), an apparent white point determined from image measurement and analysis, or a combination of the foregoing. The term "white point" may refer to a color characteristic of a digital video frame or other image, or to a value representing the color characteristic. The intended meaning may be expressly stated, or implicitly apparent from the context in which the term is used.

Video distribution formats specifications typically define color-difference transform equations that should be used by their format. For example, the Rec. 709 format is commonly used for High-Definition (HD) video distribution and specifies the following color difference equation:

$$\begin{bmatrix} Y' \\ Pb \\ Pr \end{bmatrix} = \begin{bmatrix} 0.2126 & 0.7152 & .0722 \\ -.114572 & -.385428 & .5 \\ .5 & -.454153 & -.045847 \end{bmatrix} \begin{bmatrix} R' \\ G' \\ B' \end{bmatrix}$$

For further example, the Rec. 601 format is commonly used for Standard-Definition (SD) video distribution and specifies the following color difference equation:

$$\begin{bmatrix} Y' \\ Pb \\ Pr \end{bmatrix} = \begin{bmatrix} .299 & .587 & .114 \\ -.168736 & -.331264 & .5 \\ .5 & -.418688 & -.081312 \end{bmatrix} \begin{bmatrix} R' \\ G' \\ B' \end{bmatrix}$$

The Rec. 601 and Rec. 709 color-difference equations have been optimized for their particular R'G'B' input image data formats. Because the Rec. 601 and Rec. 709 have utilize different R'G'B' data, they have correspondingly different color-difference equations. If a color-difference equation is going to be used with X'Y'Z' data instead of a particular R'G'B' data format, then the color-difference equation should be developed such that it considers the particular characteristics of the input data format. In this case, because the input format is X'Y'Z' image data, the properties of the X'Y'Z' data format should be considered.

For example, the $Y^*C_zC_x$ color difference transform has been in use in Digital Cinema Distribution applications for a number of years. The $Y^*C_xC_z$ color-difference transform converts the X'Y'Z' image data used in Digital Cinema into a color-difference format. An example of a $Y^*C_xC_z$ transform equation is shown below:

$$\begin{bmatrix} Y' \\ Cz \\ Cx \end{bmatrix} = \begin{bmatrix} .299 & .587 & .114 \\ -.168736 & -.331264 & .5 \\ .5 & -.418688 & -.081312 \end{bmatrix} \begin{bmatrix} X' \\ Y' \\ Z' \end{bmatrix}$$

The $Y^*C_xC_z$ color-difference equation is the same the Rec. 601 color-difference equation. The $Y^*C_xC_z$ color-difference equation was not specifically designed for use with X'Y'Z' input image data. Its use for Digital Cinema applications is due to the fact that the JPEG2000 image compression standard uses the Rec. 601 color-difference equations as part of its input processing framework. Compression tests have shown that the use of the $Y^*C_xC_z$ format improves compression performance even though it was not specifically designed for the X'Y'Z' image data format.

Use of a $Y'D_zD_x$ color difference transform has recently been suggested as an alternative to $Y^*C_zC_x$, for next generation video applications utilizing X'Y'Z' image data. An example of a $Y'D_zD_x$ transform equation is shown below:

$$\begin{bmatrix} Y' \\ Dz \\ Dx \end{bmatrix} = \begin{bmatrix} 0 & 1 & 0 \\ 0 & -.5 & .5 \\ .5 & -.5 & 0 \end{bmatrix} \begin{bmatrix} X' \\ Y' \\ Z' \end{bmatrix}$$

The benefits of the $Y'D_zD_x$ transform over the widely used $Y^*C_xC_z$ may include avoiding modification of the luminance Y' channel already present in X'Y'Z' image data, and simplifying implementation by maximizing power-of-two arithmetic (for example, using coefficients 0.5 and 1 in X'Y'Z' to $Y'D_zD_x$ forward transform and coefficients 1 and 2 in $Y'D_zD_x$ to X'Y'Z' inverse transform). The $Y'D_zD_x$ format was designed with consideration of the some of the properties of the X'Y'Z' image data format.

Different creative white points will be used when creating X'Y'Z' images. Therefore, the color neutral axis of the image data may vary away from the equal energy axis (X'=Y'=Z'). The $Y'D_zD_x$ transform shown above is ideal for images that have been mastered using a creative white point with chromaticity (x,y)=(0.3333,0.3333). If this equal-energy white point is used as the creative white point, then the neutral axis of the image data will move along the chromaticity vector defined by the two 3-dimensional coordinates: (x,y, Y)=(0.3333,0.3333, black-luminance) to (x,y, Y)=(0.3333,0.3333, white-luminance), where black-luminance and white-luminance are set to correspond to the luminance range of the mastering environment. For example, the mastering system may use a projector similar to those used for Digital Cinema Mastering, with white-luminance=48.0 cd/m$^2$ and a black-luminance=0.00625 cd/m$^2$.

If different creative white points are used during mastering, then the neutral axis of the image data will move along a different vector that corresponds to the actual creative white point that is used to create the imagery. Generally, the neutral axis is the 3-dimensional vector between two 3-dimensional coordinates (x,y, Y); the black point and the white point. The black-point is defined as (x,y, Y)=($x_{cw}$, $y_{cw}$, $Y_b$) and the white point is (x,y, Y)=($x_{cw}$, $y_{cw}$, $Y_b$), where ($x_{cw}$,$y_{cw}$) is the chromaticity of the selected creative white point, $Y_b$ is the luminance corresponding to black in the mastering environment and $Y_w$ is the peak luminance of the white corresponding to the mastering environment.

Therefore, it is possible to define a new color-difference transform for X'Y'Z' imagery that has been tailored for a particular neutral gray axis defined by creative white point and black point selected during mastering. The new form of color-difference transform is show in the matrix equations below:

Encoding equation—matrix/vector form:

$$\begin{bmatrix} Y' \\ Dzw \\ Dxw \end{bmatrix} = \begin{bmatrix} 0 & 1 & 0 \\ 0 & -0.5*a & 0.5 \\ 0.5 & -0.5*b & 0 \end{bmatrix} \begin{bmatrix} X' \\ Y' \\ Z' \end{bmatrix}$$

Encoding equation—direct form:

$Y'=Y'$ $Dzw=0.5*(Z'-a*Y')$ $Dxw=0.5*(X'-b*Y')$

Decoding equation—matrix/vector form:

$$\begin{bmatrix} X' \\ Y' \\ Z' \end{bmatrix} = \begin{bmatrix} b & 0 & 2 \\ 1 & 0 & 0 \\ a & 2 & 0 \end{bmatrix} \begin{bmatrix} Y' \\ Dzw \\ Dxw \end{bmatrix}$$

Decoding equation—direct form:

$X'=b*Y'+2*Dxw$ $Y'=Y'$ $Z'=a*Y'+2*Dzw$ where $$a = \left( \frac{\text{input\_output\_normalized\_encoding}(Z_{cw})}{\text{input\_output\_normalized\_encoding}(Y_{cw})} \right)$$

and $$b = \left( \frac{\text{input\_output\_normalized\_encoding}(X_{cw})}{\text{input\_output\_normalized\_encoding}(Y_{cw})} \right),$$

and input_output_normalized_encoding(x) function is a normalized version of the equation used to convert from linear light signals corresponding to International Commission on Illumination (CIE) XYZ tri-stimulus values reflected off the mastering screen to a representation of the digital code values used for storage and transmission. The value of $X_{cw}$, $Y_{cw}$ and $Z_{cw}$ are the normalized CIE tri-stimulus values corresponding to a particular luminance and chromaticity. The values are normalized so $Y_{cw}$ is equal to 1.0 for the peak luminance supported by the system. The chromaticity used should be the chromaticity of the creative white point used, and the luminance Y used should be set to the peak luminance level when using standard dynamic range imagery or the average or median value of the luminance of images that will be used for high dynamic range imagery. The equations for X, Y and Z, given a luminance level Y and the chromaticity of the creative white point $(x,y)=(x_{cw},y_{cw})$ are shown below:

$$X_{cw} = \left(\frac{x_{cw}}{y_{cw}}\right) Y$$

$$Y_{cw} = Y$$

$$Z_{cw} = \left(\frac{1 - x_{cw} - y_{cw}}{y_{cw}}\right) Y$$

For certain encoding functions that use linear or power-function style encoding functions, many different luminance values will result in the same values of coefficients a and b. For other encoding functions like for example Dolby PQ, different selected luminance values will result in slightly different values for the a and b coefficients.

If the X'Y'Z' images are encoded for Digital Cinema Distribution, then they will use the encoding equation specified in SMPTE 428-1 used to represent CIE XYZ tri-stimulus values as the Digital Cinema Distribution Master (DCDM) image data. The DCDM encoding equation is shown below:

$$\text{encoding}(X) = CV_{X'} = \text{INT}\left[ 4095 * \left(\frac{L*X}{52.37}\right)^{\frac{1}{2.6}} \right]$$

In this case, the output of the encoding(X) function would range from [0,4095]. To normalize the output of the encoding equation, the output is divided by the maximum code value (in this case 4095), as shown below:

$$\text{output\_normalized\_encoding}(X) = \left(\frac{L*X}{52.37}\right)^{\frac{1}{2.6}}$$

The value of output_normalized_encoding(X) will range from [0.0, 1.0]. If the input signal is also normalized to range from [0.0, 1.0], then this is referred to as input_output_normalized_encoding(x) and is shown below:

input_output_normalized_encoding(X)=(X)$^{1/2.6}$

A current practice in Digital Cinema is to choose a white point such that the peak luminance (Y) is 48.0 cd/m$^2$, and the chromaticity (x,y) is somewhere within the boundary defined by the three chromaticity coordinates of D65 (x,y)=(0.3127,0.3290), D55 (x,y)=(0.3323,0.3474) and DCI-P3 Calibration White (x,y)=(0.3140,0.3510). The DCDM code-values for these particular white points and others are shown in table 100 (FIG. 1).

FIG. 2 is a line diagram 200 showing an (x,y) chromaticity plot based on the example white points from the table 100 of FIG. 1. A digital signal processor may compute the a and b coefficients used by the new color-difference transform matrix for a particular creative white point, luminance and a particular encoding function. The examples in table 300 shown in FIG. 3 show examples of results from calculations using the DCDM encoding function and corresponding white points described in the text above.

Encoding and Decoding equations for the new Y'D$_{zw}$D$_{xw}$ color difference format are listed below for DCDM encoding and different creative white points:

D55 encoding and decoding equation:

$$\begin{bmatrix} Y' \\ Dzw \\ Dxw \end{bmatrix} = \begin{bmatrix} 0 & 1 & 0 \\ 0 & -0.48462 & 0.5 \\ 0.5 & -0.49153 & 0 \end{bmatrix} \begin{bmatrix} X' \\ Y' \\ Z' \end{bmatrix}$$

$$\begin{bmatrix} X' \\ Y' \\ Z' \end{bmatrix} = \begin{bmatrix} 0.98305 & 0 & 2 \\ 1 & 0 & 0 \\ 0.96924 & 2 & 0 \end{bmatrix} \begin{bmatrix} Y' \\ Dzw \\ Dxw \end{bmatrix}$$

D60 encoding and decoding equation:

$$\begin{bmatrix} Y' \\ Dzw \\ Dxw \end{bmatrix} = \begin{bmatrix} 0 & 1 & 0 \\ 0 & -0.50153 & 0.5 \\ 0.5 & -0.4907 & 0 \end{bmatrix} \begin{bmatrix} X' \\ Y' \\ Z' \end{bmatrix}$$

$$\begin{bmatrix} X' \\ Y' \\ Z' \end{bmatrix} = \begin{bmatrix} 0.98138 & 0 & 2 \\ 1 & 0 & 0 \\ 1.00307 & 2 & 0 \end{bmatrix} \begin{bmatrix} Y' \\ Dzw \\ Dxw \end{bmatrix}$$

D61 encoding and decoding equation:

$$\begin{bmatrix} Y' \\ Dzw \\ Dxw \end{bmatrix} = \begin{bmatrix} 0 & 1 & 0 \\ 0 & -0.50466 & 0.5 \\ 0.5 & -0.49059 & 0 \end{bmatrix} \begin{bmatrix} X' \\ Y' \\ Z' \end{bmatrix}$$

$$\begin{bmatrix} X' \\ Y' \\ Z' \end{bmatrix} = \begin{bmatrix} 0.98117 & 0 & 2 \\ 1 & 0 & 0 \\ 1.00932 & 2 & 0 \end{bmatrix} \begin{bmatrix} Y' \\ Dzw \\ Dxw \end{bmatrix}$$

D65 encoding and decoding equation:

$$\begin{bmatrix} Y' \\ Dzw \\ Dxw \end{bmatrix} = \begin{bmatrix} 0 & 1 & 0 \\ 0 & -0.51668 & 0.5 \\ 0.5 & -0.49032 & 0 \end{bmatrix} \begin{bmatrix} X' \\ Y' \\ Z' \end{bmatrix}$$

$$\begin{bmatrix} X' \\ Y' \\ Z' \end{bmatrix} = \begin{bmatrix} 0.98065 & 0 & 2 \\ 1 & 0 & 0 \\ 1.03336 & 2 & 0 \end{bmatrix} \begin{bmatrix} Y' \\ Dzw \\ Dxw \end{bmatrix}$$

EE encoding and decoding equation:

$$\begin{bmatrix} Y' \\ Dzw \\ Dxw \end{bmatrix} = \begin{bmatrix} 0 & 1 & 0 \\ 0 & -0.5 & 0.5 \\ 0.5 & -0.5 & 0 \end{bmatrix} \begin{bmatrix} X' \\ Y' \\ Z' \end{bmatrix}$$

$$\begin{bmatrix} X' \\ Y' \\ Z' \end{bmatrix} = \begin{bmatrix} 1 & 0 & 2 \\ 1 & 0 & 0 \\ 1 & 2 & 0 \end{bmatrix} \begin{bmatrix} Y' \\ Dzw \\ Dxw \end{bmatrix}$$

DCI-P3 Calibration White encoding and decoding equation:

$$\begin{bmatrix} Y' \\ Dzw \\ Dxw \end{bmatrix} = \begin{bmatrix} 0 & 1 & 0 \\ 0 & -0.49111 & 0.5 \\ 0.5 & -0.47903 & 0 \end{bmatrix} \begin{bmatrix} X' \\ Y' \\ Z' \end{bmatrix}$$

$$\begin{bmatrix} X' \\ Y' \\ Z' \end{bmatrix} = \begin{bmatrix} 0.95806 & 0 & 2 \\ 1 & 0 & 0 \\ 0.98222 & 2 & 0 \end{bmatrix} \begin{bmatrix} Y' \\ Dzw \\ Dxw \end{bmatrix}$$

The table 400 in FIG. 4 shows the $D_z$ and $D_x$ values computed using the simple X'Y'Z'→Y'$D_z D_x$ matrix, and the more advanced matrix X'Y'Z'→Y'$D_{zw} D_{xw}$ that is computed specifically for a particular creative white point. The result of this more advanced transform is that when a particular creative white point is converted to Y'$D_{zw} D_{xw}$ using the matrix for that was computed specifically for that creative white point, then the $D_{zw}$ and $D_{xw}$ color difference channels will be zero, which is not the case for the $D_z$ and $D_x$ color difference channels, as shown in table 400.

This property of $D_{zw}=0$ and $D_{xw}=0$ may hold for all code-values that lie along the creative neutral axis, from white to black, not just for the code value corresponding to the peak luminance (in this case 48.0 nits). The tables 500-1000 in FIGS. 5-10 enumerate through various levels of gray for different creative white points.

Increasing the dynamic range of the transformed output values may not be ideal when the output values need to be further quantized to integer code-values. The equations for Y'$D_{zw} D_{xw}$ described above do not consider that the total dynamic range of the transformed output values may be increased slightly in comparison to the total dynamic range of the input values. The equations for Y'$D_{zw} D_{xw}$ can be further modified to ensure that the total dynamic range of the output does not exceed that of the total dynamic range of the input, as follows:

Encoding equation—matrix/vector form:

$$\begin{bmatrix} Y' \\ Dzw \\ Dxw \end{bmatrix} = \begin{bmatrix} 0 & 1 & 0 \\ 0 & -0.5*a*c & 0.5*c \\ 0.5*d & -0.5*b*d & 0 \end{bmatrix} \begin{bmatrix} X' \\ Y' \\ Z' \end{bmatrix}$$

Encoding equation—direct form:

Y'=Y'

$Dzw = 0.5*c*(Z'-a*Y')$ $Dxw = 0.5*d*(X'-b*Y')$

Decoding equation—matrix/vector form:

$$\begin{bmatrix} X' \\ Y' \\ Z' \end{bmatrix} = \begin{bmatrix} b & 0 & (2/d) \\ 1 & 0 & 0 \\ a & (2/c) & 0 \end{bmatrix} \begin{bmatrix} Y' \\ Dzw \\ Dxw \end{bmatrix}$$

Decoding equation—direct form:

$X' = b*Y' + (2/d)*Dxw$

Y'=Y'

$Z' = a*Y' + (2/c)*Dzw$ where the constants c and d are scaling factors that ensure the total dynamic range of the transformed outputs does not increase relative to the total dynamic range of the inputs. The equations for c and d are shown below:

$$c = \min(1, (1/a))$$

$$d = \min(1, (1/b))$$

The equations for constants a and b were described previously in this document.

Example values of constants a, b, c and d are shown in the table 1100 in FIG. 11 that were calculated using the DCDM encoding function and corresponding white points.

Encoding and decoding equations for the new $Y'D_{zw}D_{xw}$ color difference format that does not increase the output dynamic range are listed below for DCDM encoding and corresponding creative white points:

D55 encoding and decoding equation:

$$\begin{bmatrix} Y' \\ Dzw \\ Dxw \end{bmatrix} = \begin{bmatrix} 0 & 1 & 0 \\ 0 & -0.48462 & 0.5 \\ 0.5 & -0.49153 & 0 \end{bmatrix} \begin{bmatrix} X' \\ Y' \\ Z' \end{bmatrix}$$

$$\begin{bmatrix} X' \\ Y' \\ Z' \end{bmatrix} = \begin{bmatrix} 0.98305 & 0 & 2 \\ 1 & 0 & 0 \\ 0.96924 & 2 & 0 \end{bmatrix} \begin{bmatrix} Y' \\ Dzw \\ Dxw \end{bmatrix}$$

D60 encoding and decoding equation:

$$\begin{bmatrix} Y' \\ Dzw \\ Dxw \end{bmatrix} = \begin{bmatrix} 0 & 1 & 0 \\ 0 & -0.5 & 0.49847 \\ 0.5 & -0.4907 & 0 \end{bmatrix} \begin{bmatrix} X' \\ Y' \\ Z' \end{bmatrix}$$

$$\begin{bmatrix} X' \\ Y' \\ Z' \end{bmatrix} = \begin{bmatrix} 0.98138 & 0 & 2 \\ 1 & 0 & 0 \\ 1.00307 & 2.0613 & 0 \end{bmatrix} \begin{bmatrix} Y' \\ Dzw \\ Dxw \end{bmatrix}$$

D61 encoding and decoding equation:

$$\begin{bmatrix} Y' \\ Dzw \\ Dxw \end{bmatrix} = \begin{bmatrix} 0 & 1 & 0 \\ 0 & -0.5 & 0.49539 \\ 0.5 & -0.49059 & 0 \end{bmatrix} \begin{bmatrix} X' \\ Y' \\ Z' \end{bmatrix}$$

$$\begin{bmatrix} X' \\ Y' \\ Z' \end{bmatrix} = \begin{bmatrix} 0.98117 & 0 & 2 \\ 1 & 0 & 0 \\ 1.00932 & 2.01863 & 0 \end{bmatrix} \begin{bmatrix} Y' \\ Dzw \\ Dxw \end{bmatrix}$$

D65 encoding and decoding equation:

$$\begin{bmatrix} Y' \\ Dzw \\ Dxw \end{bmatrix} = \begin{bmatrix} 0 & 1 & 0 \\ 0 & -0.5 & 0.48386 \\ 0.5 & -0.49032 & 0 \end{bmatrix} \begin{bmatrix} X' \\ Y' \\ Z' \end{bmatrix}$$

$$\begin{bmatrix} X' \\ Y' \\ Z' \end{bmatrix} = \begin{bmatrix} 0.98065 & 0 & 2 \\ 1 & 0 & 0 \\ 1.03336 & 2.06671 & 0 \end{bmatrix} \begin{bmatrix} Y' \\ Dzw \\ Dxw \end{bmatrix}$$

EE encoding and decoding equation:

$$\begin{bmatrix} Y' \\ Dzw \\ Dxw \end{bmatrix} = \begin{bmatrix} 0 & 1 & 0 \\ 0 & -0.5 & 0.5 \\ 0.5 & -0.5 & 0 \end{bmatrix} \begin{bmatrix} X' \\ Y' \\ Z' \end{bmatrix}$$

$$\begin{bmatrix} X' \\ Y' \\ Z' \end{bmatrix} = \begin{bmatrix} 1 & 0 & 2 \\ 1 & 0 & 0 \\ 1 & 2 & 0 \end{bmatrix} \begin{bmatrix} Y' \\ Dzw \\ Dxw \end{bmatrix}$$

DCI-P3 Calibration White encoding and decoding equation:

$$\begin{bmatrix} Y' \\ Dzw \\ Dxw \end{bmatrix} = \begin{bmatrix} 0 & 1 & 0 \\ 0 & -0.49111 & 0.5 \\ 0.5 & -0.47903 & 0 \end{bmatrix} \begin{bmatrix} X' \\ Y' \\ Z' \end{bmatrix}$$

$$\begin{bmatrix} X' \\ Y' \\ Z' \end{bmatrix} = \begin{bmatrix} 0.95806 & 0 & 2 \\ 1 & 0 & 0 \\ 0.98222 & 2 & 0 \end{bmatrix} \begin{bmatrix} Y' \\ Dzw \\ Dxw \end{bmatrix}$$

The table 1200 in FIG. 12 shows the values of $D_{zw}$ and $D_{xw}$ with and without scaling, when the $Y'D_{zw}D_{xw}$ transform is computed for D60 creative white point and DCDM encoding.

The table 1300 in FIG. 13 shows the values of $D_{zw}$ and $D_{xw}$ with and without scaling, when the $Y'D_{zw}D_{xw}$ transform is computed for D61 creative white point and DCDM encoding. The table 1400 in FIG. 14 shows the values of $D_{zw}$ and $D_{xw}$ with and without scaling, when the $Y'D_{zw}D_{xw}$ transform is computed for D65 creative white point and DCDM encoding.

The enhancement to the color-difference transform for X'Y'Z' imagery described previously with a, b coefficients, or with a, b, c, and d coefficients is ideal when the relationship between the encoded XYZ values is constant all values of luminance Y for a given creative white point. This property holds when the encoding transfer function is linear or a power function of the form:

$$Y = hx$$

$$Y = x^g$$

where h and g are constants. The DCDM encoding fits the power-function style encoding with g=(1/2.6), and thus is optimally suited for the enhancement to the color-difference transform for X'Y'Z' imagery using the coefficients 'a' and 'b,' or 'a', 'b,' 'c' and 'd' as described previously. In this case because the transformation of the white point results in the same coefficients, 'a' and 'b,' or 'a', 'b,' 'c' and 'd,' regardless of the normalized luminance of the particular white point used to calculate the coefficients. For power-function style encoding functions, the application of the encoding transfer function results in the same ratio, whether the encoding is performed before or after division, as shown below for a and b coefficients:

$$a = \frac{Z^g}{Y^g} = \left(\frac{Z}{Y}\right)^g$$

$$b = \frac{X^g}{Y^g} = \left(\frac{X}{Y}\right)^g$$

The same property is true for linear encoding functions of the form y=hx, as shown below for 'a' and 'b' coefficients:

$$a = \frac{hZ}{hY} = h\left(\frac{Z}{Y}\right)$$

$$b = \frac{hX}{hY} = h\left(\frac{X}{Y}\right)$$

The enhancement to the color-difference transform for X'Y'Z' imagery described in this document may be extended beyond the specific examples listed in this document. The examples listed in this document may be applied to DCDM encoding and creative white points of D55, D60, D61, D65, EE, DCI-P3 Calibration White. The same techniques may similarly be applied to other creative white points, like D93, 9300K, 9305K, 6500K, 6300K, Illuminant E, 5400K, etc.

The same techniques could also be applied to other encoding functions like Dolby's Perceptual Quantizer (PQ) that has recently been proposed for used with high-dynamic range imagery, linear encodings that do not utilize a non-linear transfer function, or other encodings that use other non-linear transfer functions.

The Dolby Perceptual Quantizer (PQ) was described in a paper presented at the 2012 SMPTE Annual Technical Conference & Exhibition. The PQ decoding equation was described in that paper as follows:

$$Y = L\left(\frac{V^{\frac{1}{m}} - c_1}{c_2 - c_3 V^{\frac{1}{m}}}\right)^{\frac{1}{n}}$$

where V is in range [0.0, 1.0], L=10000, m=78.8438, n=0.1593, $c_1$=0.8359, $c_2$=18.8516, and $c_3$=18.6875. Using the above decoding equation the output Y will be in the range [0.0, 10000.0]. The decoding equation can be normalized so its output is in range [0.0, 1.0] by dividing by L, leading to the following decoding equation:

$$Y = \left(\frac{V^{\frac{1}{m}} - c_1}{c_2 - c_3 V^{\frac{1}{m}}}\right)^{\frac{1}{n}}$$

The encoding equation is typically the inverse of the decoding equation, and can be determined by inverting the corresponding encoding equation, and is shown below:

$$V = \left(\frac{Y^n c_2 + c_1}{1 + Y^n c_3}\right)^m$$

The above equation is in the form of a normalized input and output encoding equation, where both the input (Y) and output (V) will be in range [0.0, 1.0]. This equation can be rewritten in the form used to describe the modification of the color difference equations as shown below:

$$\text{input\_output\_normalized\_encoding}(X) = \left(\frac{X^n c_2 + c_1}{1 + X^n c_3}\right)^m$$

where m=78.8438, n=0.1593, $c_1$=0.8359, $c_2$=18.8516, and $c_3$=18.6875.

The table 1500 in FIG. 15 shows the different a, b, c and d coefficients that result from using the Dolby PQ encoding function and different creative white points with different luminance levels. For high dynamic range imagery, the 'a,' 'b,' 'c' and 'd' coefficients should be determined using the average or median luminance level of the content.

The technology disclosed herein may be implemented as encoded instructions including algorithms on a non-transitory computer-readable medium, which, when executed by one or more processors of a computer specially equipped for digital image processing, cause the computer to perform the novel operation as described above to achieve results as described herein. The non-transitory computer-readable medium may be, or may include, a storage medium or memory medium. The technology may be implemented in an apparatus, for example a digital electronic computer, having a processor and memory, wherein the memory holds code for causing the computer to perform the novel method to achieve results as described herein. The present disclosure therefore discloses illustrative steps of a method as exemplifying the novel technology, which is not limited to a method and may be implemented in various other ways such as described herein.

Figure 16:
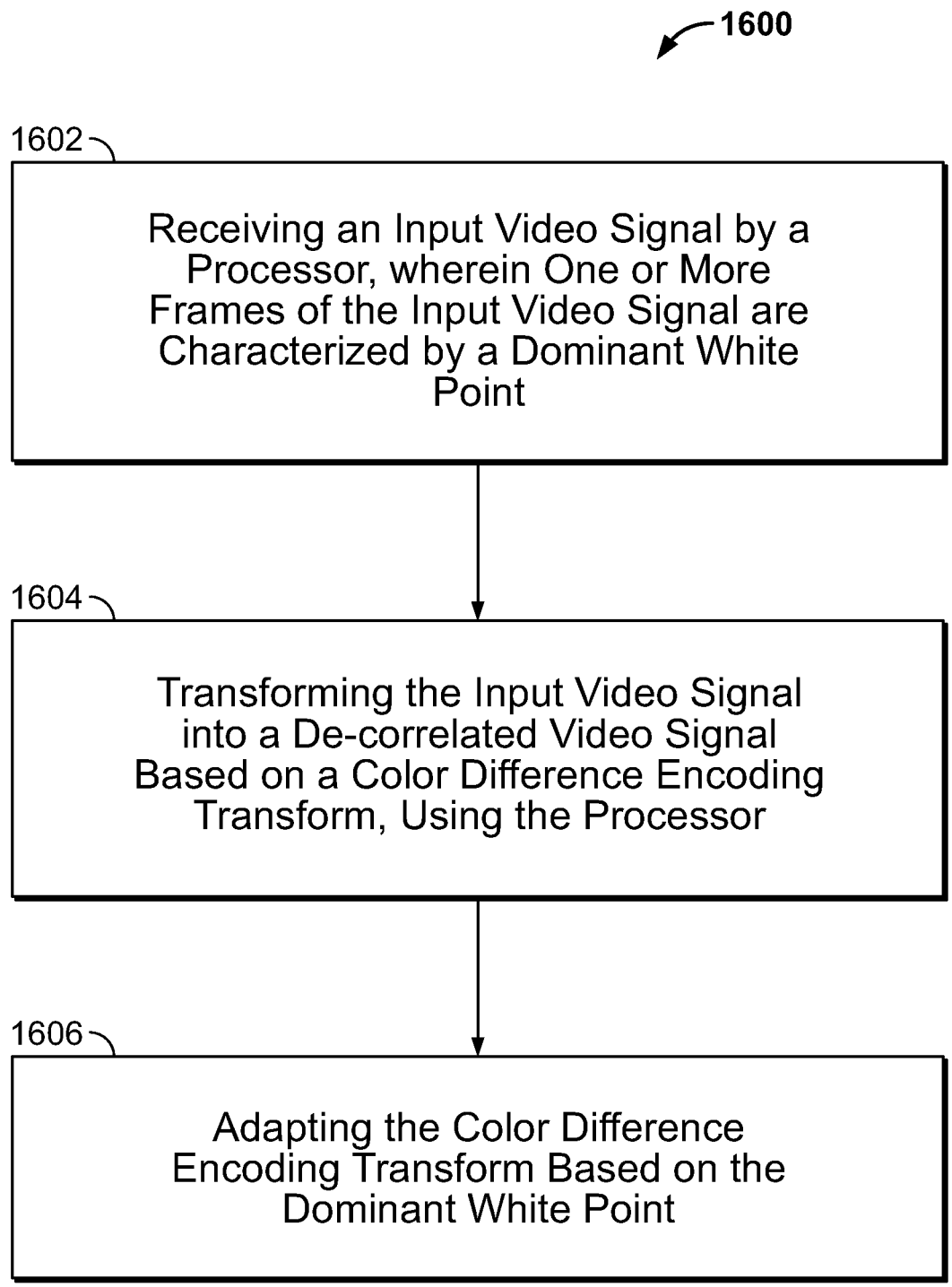
FIG. 16 shows aspects of a method for encoding a video signal.

Referring to FIG. 16, an example of a method 1600 for encoding a video signal may be performed by a processor, for example a digital signal processor, in a computing device. The computing device may include an input port for receiving a video signal, for example, from a video camera, video archive stored in a computer readable medium, or transmitted from a remote source. At 1602, a processor may receive an input video signal, wherein one or more frames of the input video signal are characterized by a dominant white point. The processor may determine the dominant white point by operating an image analysis algorithm as known in the art for measuring a dominant white point, on the one or more frames. In an alternative, or in addition, the processor may receive an indication of a dominant white point for each of the one or more frames, determined in an independent process, in associated metadata. At 1604, the method may include transforming the input video signal into a de-correlated video signal based on a color difference encoding transform, using the processor. At 1604, the method may include adapting the color difference encoding transform based on the dominant white point. For example, the processor may perform the adapting using any of the more detailed algorithms described above.

For further example, according to aspects of the method or more detailed algorithms, the operation 1604 of adapting the color difference encoding transform may be based on a pair of coefficients that are adaptively determined. For example, determining the pair of coefficients may include using respective ratios of a normalized encoding function operating on image chromaticity inputs. In the alternative, or in addition, determining the pair of coefficients may be based simultaneously on dominant white point and at least one of average or median picture levels.

According to further aspects of the method or more detailed algorithms, the operation 1604 of adapting the color difference encoding transform may include causing the compressed video signal to be more highly compressed than without the adapting. In other words, the adapting may be directed to enabling a more efficiently compressible output. The method may include storing the output in a non-transitory computer-readable medium, for example an optical or magnetic medium, or in an electronic memory. In the alternative, or in addition, the method may include transmitting the output to a decoding apparatus, which may in turn generate a video signal provided to a display device for driving a video display output.

In aspects of the method 1600, determining the dominant white point may be based on the frames of the input video signal, using the processor. In an aspect, the processor may change values of the dominant white point between sets of the frames, based on the determining. In other aspects, determining the dominant white point may include obtaining a value of the dominant white point from metadata associated with the frames. In still further aspects, determining the dominant white point may include analyzing at least one image in the frames, using the processor.

In other aspects, the input signal may be based on an International Commission of Illumination (CIE) XYZ color space encoded using a non-linear encoding function. Adapting the color different encoding transform may be further based on the non-linear encoding function.

Figure 17:
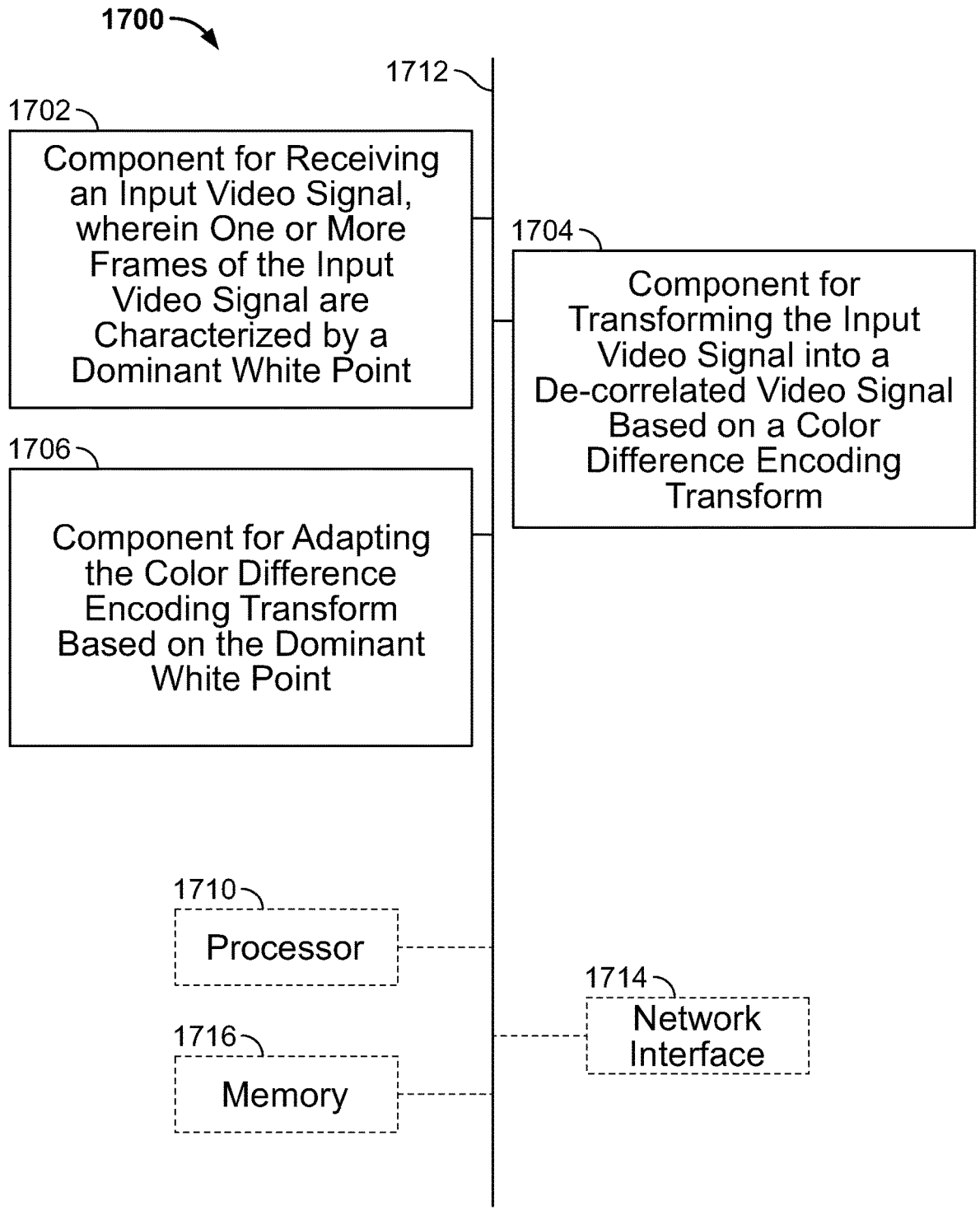
FIG. 17 shows aspects of an apparatus for encoding a video signal.

Consistent with method 1600, and as further illustrated by FIG. 17, an apparatus 1700 for encoding a video signal may perform the method and more detailed aspects thereof. The apparatus 1700 may comprise an electronic component or module 1702 for receiving an input video signal, wherein frames of the input video signal are characterized by a dominant white point. The apparatus 1700 may comprise an electronic component or module 1704 for transforming the input video signal into a de-correlated video signal based on a color difference encoding transform. In addition, the apparatus 1700 may comprise an electronic component or module 1706 for adapting the color difference encoding transform based on the dominant white point.

The apparatus 1700 may optionally include a processor module 1710 having at least one processor; in the case of the apparatus 1700 this may be configured as a digital image processor, rather than as a general purpose microprocessor. The processor 1710, in such case, may be in operative communication with the modules 1702-1706 via a bus 1712 or similar communication coupling. The processor 1710 may effect initiation and scheduling of the processes or functions performed by electrical components 1702-1706, and other operations described in connection with method 1600.

In related aspects, the apparatus 1700 may include a network interface module 1714 through with the processor 1710 may send and receive information to clients and other servers. In further related aspects, the apparatus 1700 may optionally include a module for storing information, such as, for example, a memory device/module 1716. The computer readable medium or the memory module 1716 may be operatively coupled to the other components of the apparatus 1700 via the bus 1712 or the like. The memory module 1716 may be adapted to store computer readable instructions and data for effecting the processes and behavior of the modules 1702-1706, and subcomponents thereof, or the processor 1710, pre-processed video data, post-processed video data, or the methods disclosed herein, and other operations for processing a video signal as disclosed herein. The memory module 1716 may retain instructions for executing functions associated with the modules 1702-1706, and other aspects of the method 1600 or the more detailed algorithms described herein. While shown as being external to the memory 1716, it is to be understood that the modules 1702-1706 may exist at least partly within the memory 1716.

The apparatus 1700 may include additional special-purpose components for video processing as known in the art, for example, the processor 1710 may be coupled to a video input source and a video output sink and may make use of a multi-core computer graphics (CG) processing subsystem. The CG subsystem may comprise, for example, a high-end video card coupled to the processor 1710 via a bus, which processor may comprise a central processing unit (CPU), or may comprise an integrated graphics processing component built on the same chip as the CPU.

Figure 18:
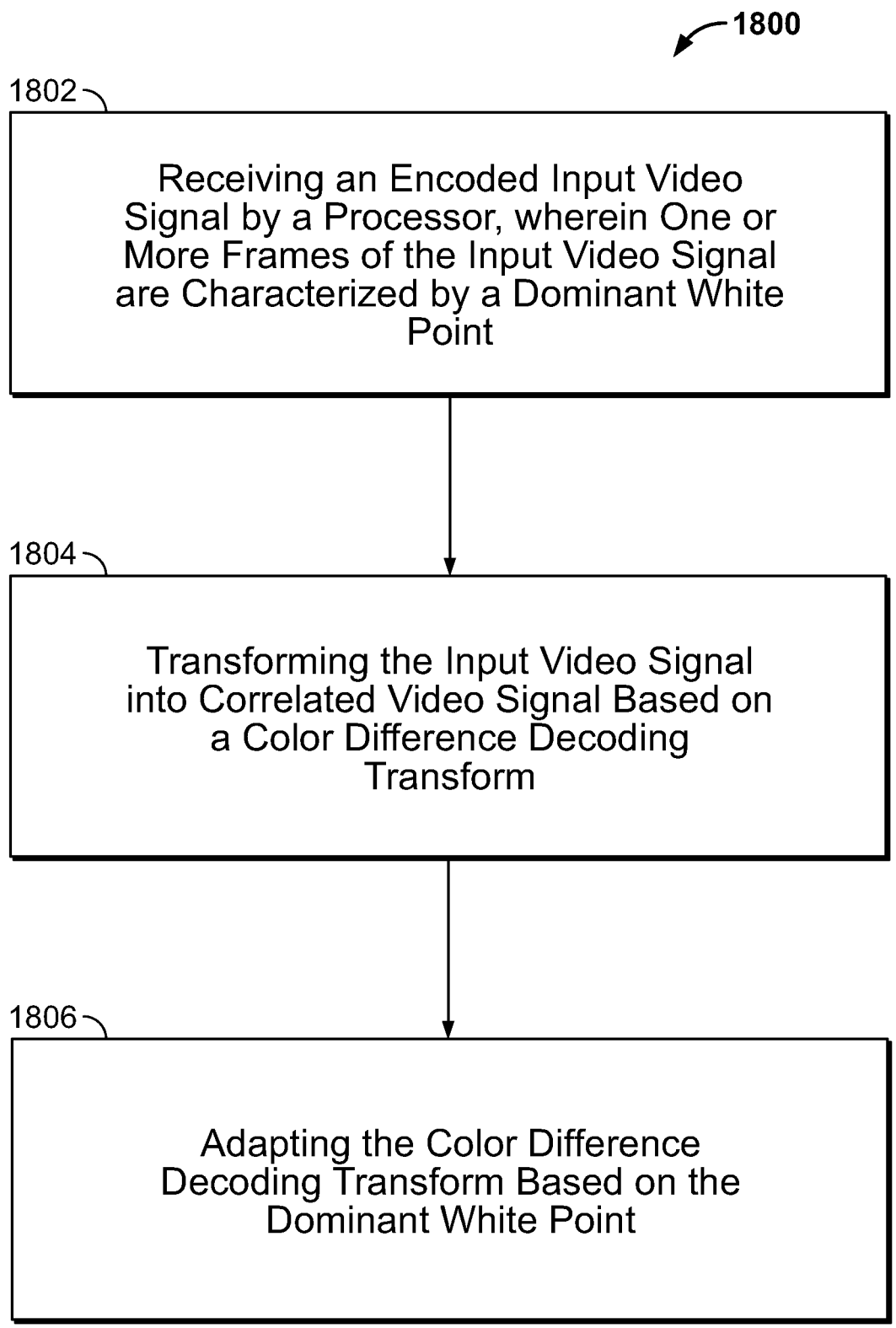
FIG. 18 shows aspects of a method for decoding a video signal.

Referring to FIG. 18, an example of a method 1800 for decoding a video signal may be performed by a processor, for example a digital signal processor, in a computing device. At 1802, the method may include receiving an encoded input video signal by a processor, wherein frames of the input video signal are characterized by a dominant white point. The processor, or a separate device, may receive compressed video data, and obtain the encoded video data by de-compressing the compressed video data. The processor may receive an indication of a dominant white point that has been independently determined for each of the frames, in associated metadata, for example, metadata generated by an encoding apparatus performing the method 1600. The method 1804 may further include, at 1804, transforming the input video signal into a correlated video signal based on a color difference decoding transform, using the processor. The method 1800 may further include, at 1806, adapting the color difference decoding transform based on the dominant white point using an algorithm as defined herein, which may be a converse operation to the color different encoding transform used when encoding the video data. The method may include providing the transformed video signal to a display device, causing a video display.

The method 1800 may include any of the more detailed aspects described above in connection with method 1600, and/or any of the more detailed, novel algorithms described herein above.

Figure 19:
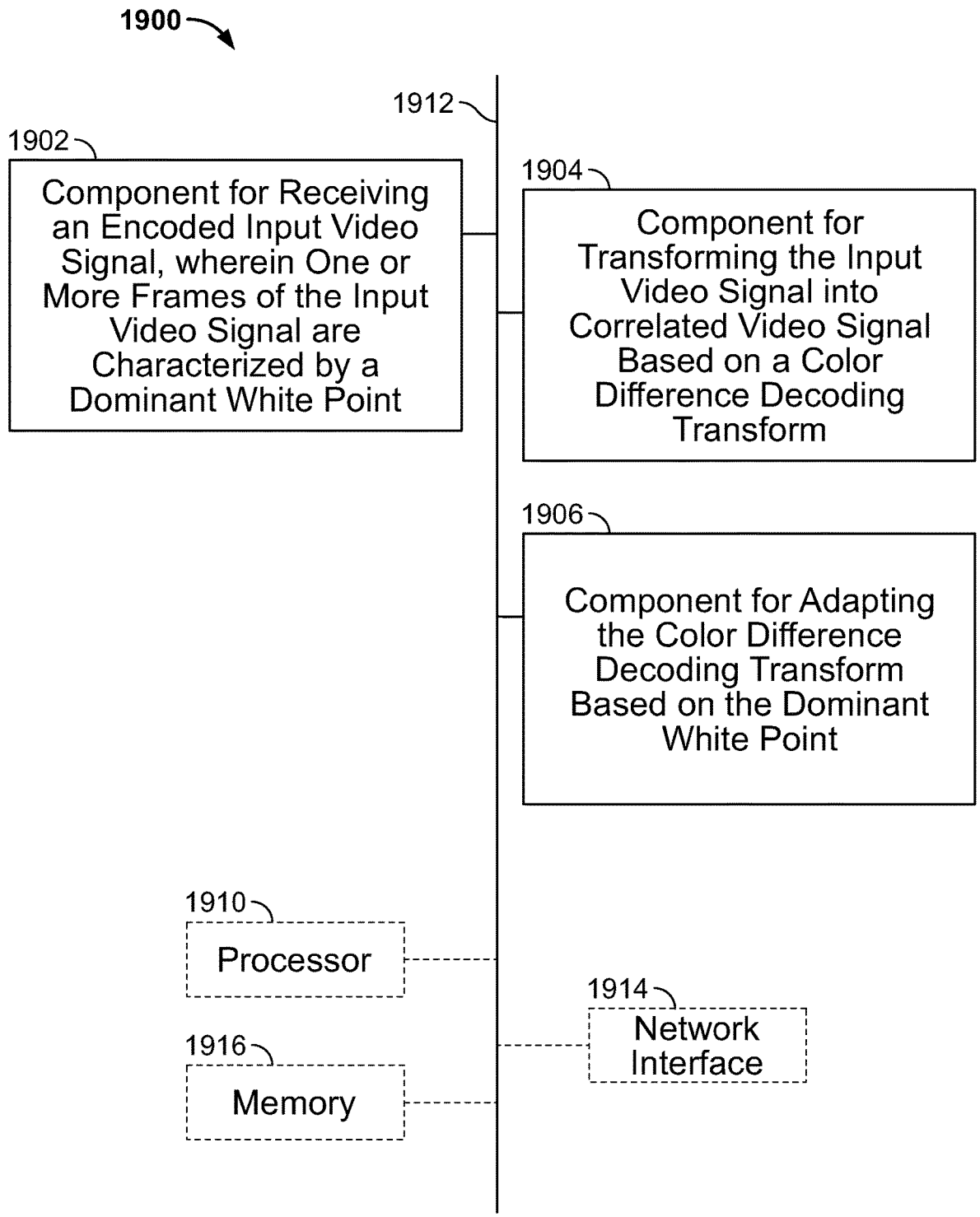
FIG. 19 shows aspects of an apparatus for decoding a video signal.

Consistent with method 1800, and as further illustrated by FIG. 19, an apparatus 1900 for decoding a video signal may perform method 1800 and any of the more detailed algorithms described herein. The apparatus 1900 may comprise an electronic component or module 1902 for receiving an encoded input video signal, wherein frames of the input video signal are characterized by a dominant white point. The apparatus 1900 may comprise an electronic component or module 1904 for transforming the input video signal into a correlated video signal based on a color difference decoding transform. In addition, the apparatus 1900 may comprise an electronic component or module 1906 for adapting the color difference decoding transform based on the dominant white point.

The apparatus 1900 may optionally include a processor module 1910 having at least one processor; in the case of the apparatus 1900 this may be configured as a digital image processor, rather than as a general purpose microprocessor. The processor 1910, in such case, may be in operative communication with the modules 1902-1906 via a bus 1912 or similar communication coupling. The processor 1910 may effect initiation and scheduling of the processes or functions performed by electrical components 1902-1906, and other operations described in connection with the 1800 or any of the detailed algorithms described herein above. In related aspects, the apparatus 1900 may include a network interface module 1914 through with the processor 1910 may send and receive information to clients and other servers. In further related aspects, the apparatus 1900 may optionally include a module for storing information, such as, for example, a memory device/module 1918. The computer readable medium or the memory module 1918 may be operatively coupled to the other components of the apparatus 1900 via the bus 1912 or the like. The memory module 1918 may be adapted to store computer readable instructions and data for effecting the processes and behavior of the modules 1902-1906, and subcomponents thereof, or the processor 1910, or other operations of the methods disclosed herein, and other operations for processing a video signal as disclosed herein. The memory module 1918 may retain instructions for executing functions associated with the modules 1902-1906. While shown as being external to the memory 1918, it is to be understood that the modules 1902-1906 may exist at least partly within the memory 1918.

The apparatus 1900 may include additional special-purpose components for video processing as known in the art, for example, the processor 1910 may be coupled to a video input source and a video output sink and may make use of a multi-core computer graphics (CG) processing subsystem. The CG subsystem may comprise, for example, a high-end video card coupled to the processor 1710 via a bus, which processor may comprise a central processing unit (CPU), or may comprise an integrated graphics processing component built on the same chip as the CPU.

As used in this application, the terms "component", "module", "system", or equivalent terms are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer-readable media may include but are not limited to magnetic storage devices (e.g., hard disk, floppy disk, magnetic strips . . . ), optical disks (e.g., compact disk (CD), digital versatile disk (DVD), smart cards, and flash memory devices (e.g., card, stick). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or non-transitory medium.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for encoding a video signal, the method comprising:

transforming, by a processor executing a color difference encoding transform, an input video signal encoded by tri-stimulus luminance and chromacity values of a color space and having video frames characterized by a dominant white point into a de-correlated video signal encoded by modified luminance and color difference values;

adapting the color difference encoding transform at least in part by adapting calculation of the color difference values based on the dominant white point and outputting the de-correlated video signal, based on the adapting.

2. The method of claim 1, wherein the adapting the color difference encoding transform is further based on a pair of coefficients multiplied by respective ones of the color difference values.

3. The method of claim 2, further comprising determining the pair of coefficients using respective ratios of a normalized encoding function operating on image chromaticity inputs.

4. The method of claim 2, further comprising determining the pair of coefficients based simultaneously on the dominant white point and at least one of average or median picture levels.

5. The method of claim 1, wherein the adapting the color difference encoding transform causes the compressed video signal to be more highly compressed than without the adapting.

6. The method of claim 1, further comprising determining the dominant white point based on the frames of the input video signal, using the processor.

7. The method of claim 6, wherein the processor changes values of the dominant white point between sets of the frames, based on the determining.

8. The method of claim 6, wherein determining the dominant white point comprises obtaining a value of the dominant white point from metadata associated with the frames.

9. The method of claim 6, wherein determining the dominant white point comprises analyzing at least one image in the frames, using the processor.

10. The method of claim 1, wherein the input signal is based on an International Commission of Illumination (CIE) XYZ color space encoded using a non-linear encoding function.

11. The method of claim 10, wherein adapting the color difference encoding transform is further based on the non-linear encoding function.

12. An apparatus comprising a processor coupled to a memory, the memory holding instructions for:
transforming, by a color difference encoding transform, an input video signal encoded by tri-stimulus luminance and chromacity values of a color space and having video frames characterized by a dominant white point into a de-correlated video signal encoded by modified luminance and color difference values;
adapting the color difference encoding transform at least in part by adapting calculation of the color difference values based on the dominant white point; and
outputting the de-correlated video signal, based on the adapting.

13. A method for decoding a video signal, the method comprising:
transforming, by a processor executing a color difference decoding transform, an input de-correlated video signal encoded by modified luminance and color difference values of a color space and having video frames characterized by a dominant white point into a correlated video signal encoded by original tri-stimulus luminance and chromaticity values;
adapting the color difference decoding transform at least in part by adapting calculation of the chromaticity values based on the dominant white point; and
outputting the correlated video signal.

14. The method of claim 13, wherein the adapting the color difference decoding transform is further based on a pair of coefficients multiplied by respective ones of the chromaticity values.

15. The method of claim 14, further comprising determining the pair of coefficients using respective ratios of a normalized encoding function operating on image chromaticity inputs.

16. The method of claim 14, further comprising determining the pair of coefficients based simultaneously on the dominant white point and at least one of average or median picture levels.

17. The method of claim 14, further comprising determining the dominant white point based on the frames of the encoded input video signal, using the processor.

18. The method of claim 17, wherein the processor changes values of the dominant white point between sets of the frames, based on the determining.

19. The method of claim 17, wherein determining the dominant white point comprises obtaining a value of the dominant white point from metadata associated with the frames.

20. The method of claim 17, wherein determining the dominant white point comprises analyzing at least one image in the frames, using the processor.

21. The method of claim 13, wherein the output signal is based on an International Commission of Illumination (CIE) XYZ color space decoded using a non-linear decoding function.

22. The method of claim 13, wherein adapting the color difference decoding transform is further based on the non-linear decoding function.

23. An apparatus comprising a processor coupled to a memory, the memory holding instructions for:
transforming, by a color difference decoding transform, an input de-correlated video signal encoded by modified luminance and color difference values of a color space and having video frames characterized by a dominant white point into a correlated video signal encoded by original tri-stimulus luminance and chromaticity values;
adapting the color difference decoding transform based on the dominant white point at least in part by adapting calculation of the chromaticity values; and
outputting the correlated video signal.

* * * * *